United States Patent
Lee

(10) Patent No.: US 7,095,571 B2
(45) Date of Patent: Aug. 22, 2006

(54) LENS SYSTEM AND PORTABLE DEVICE EMPLOYING THE SAME

(75) Inventor: Ki-woo Lee, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/018,896

(22) Filed: Dec. 21, 2004

(65) Prior Publication Data

US 2006/0056070 A1    Mar. 16, 2006

(30) Foreign Application Priority Data

Aug. 20, 2004    (KR) ............... 10-2004-0065880

(51) Int. Cl.
*G02B 9/12*    (2006.01)
*G02B 13/18*    (2006.01)
*G02B 3/02*    (2006.01)

(52) U.S. Cl. ...................... 359/791; 359/716

(58) Field of Classification Search ............ 359/784, 359/791, 708, 738, 716

See application file for complete search history.

(56) References Cited

U.S. PATENT DOCUMENTS 5,175,650 A * 12/1992 Takayama et al. .......... 359/716

FOREIGN PATENT DOCUMENTS

| JP | 2002-139605 A | 5/2002 |
|---|---|---|
| KR | 1020030001072 A | 1/2003 |

* cited by examiner

*Primary Examiner*—Alicia M. Harringtion
(74) *Attorney, Agent, or Firm*—Gardner Carton & Douglas LLP

(57) ABSTRACT

A lens system and a portable device employing the lens system are provided. The lens system includes at least three lenses and an infrared cut filter disposed between any of the lenses to prevent redness from occurring at a center region of an image as the lens system is miniaturized. An angle $\Theta_1$ at which light is incident on the infrared cut filter satisfies $14° \leq \theta_1 \leq 16°$.

14 Claims, 7 Drawing Sheets

LENS SYSTEM AND PORTABLE DEVICE EMPLOYING THE SAME

BACKGROUND OF THE INVENTION

This application claims the priority of Korean Patent Application No. 2004-65880, filed on Aug. 20, 2004, in the Korean Intellectual Property Office, the disclosure of which is incorporated herein in its entirety by reference.

1. Field of the Invention

The present invention relates to a lens system and a portable device, and more particularly, to a lens system that prevents redness from occurring at the center region of an image as the lens system is miniaturized, and a portable device employing the lens system.

2. Description of the Related Art

Generally, image pick-up devices such as charge coupled devices (CCDs) or complementary metal oxide semiconductors (CMOS) used in, for example, cameras, react to light even in the near-infrared region beginning at a wavelength of about 700 nm and in the infrared region. However, light in the near-infrared and infrared regions causes crosstalk that reduces a signal-to-noise ratio of an image pick-up device and thereby deteriorates the device's reproduction ability. In order to prevent such crosstalk, an infrared cut filter that blocks light in the near-infrared and infrared regions is installed in lens systems implemented in conventional cameras.

For example, in a conventional camera, an infrared cut filter 4 is installed between an object and a lens system, which includes a first lens 1, a second lens 2, and a third lens 3, as illustrated in FIG. 1. Alternatively, the infrared cut filter 4 can be interposed between the lens system, including the first lens 1, the second lens 2, and the third lens 3, and an image pick-up device 5 that receives light transmitted through the lens system, as illustrated in FIG. 2.

However, when placing the infrared cut filter 4 between the object and the lens system as illustrated in FIG. 1, the outer diameter of the infrared cut filter 4 is increased, thereby increasing the cost of the portable device. Also, as will be described later, increase in an angle at which light is incident on the infrared cut filter 4 is accompanied by increase in a telecentric angle, which creates reddish noise around the center of an image or bluish noise around the edges of an image. In addition, when disposing the infrared cut filter 4 between the lens system and the image pick-up device 5 as illustrated in FIG. 2, a back focal length (BFL) increases, which increases the size and cost of the image pick-up apparatus. Thus, the conventional technology presents obstacles to the current trend of producing ever more compact image pick-up apparatuses.

In an attempt to overcome such obstacles, Korean Patent Publication No. 2003-0001072 discloses an image sensor in which an infrared cut filter is mounted on a micro lens by alternately stacking oxide and nitride layers on the micro lens. Although, the cited invention can shorten a back focal length of the total length by mounting the infrared cut filter on the micro lens, the telecentric angle still increases and creates reddish noise at the center or bluish noise at the edge regions of an image.

To solve this problem, Japanese Patent Laid-Open Publication No. 2002-139605 discloses a lens manufactured using a glass that absorbs near-infrared rays. However, the invention of the Japanese patent is costly to implement and therefore not well suited for mass-produced devices.

SUMMARY OF THE INVENTION

The present invention provides a lens system that prevents redness from occurring at the center region of an image as the lens system is miniaturized, and a portable device employing the lens system.

According to an aspect of the present invention, there is provided a lens system including at least three lenses and an infrared cut filter disposed between any of the lenses such that an angle $\ominus_1$ at which light is incident on the infrared cut filter satisfies $14° \leq \theta_1 \leq 16°$. At least one lens is a plastic aspherical lens. The lens system includes three lenses. The first lens has a positive refraction power, the second lens has a positive refraction power, and the third lens has a negative refraction power, measured from a direction in which outside light enters the lens system. The infrared cut filter is disposed between the second lens and the third lens.

According to another aspect of the present invention, there is provided a portable device including the lens system. The portable device further includes an image pick-up device, and when an angle $\ominus_1$ at which light is incident on the infrared cut filter and an angle $\ominus_2$ at which light is incident on the image pick-up device satisfy $$1.06 \leq \frac{\theta_2}{\theta_1} \leq 1.87.$$

The portable device further includes an image pick-up device, and when a distance $D_1$ from a front surface of the lens system on which light is incident to the image pick-up device and a distance $D_2$ from a rear surface of the lens system through which light is output to the image pick-up device, satisfy $3.3 \text{ mm}^2 \leq D_1 \times D_2 \leq 9.12 \text{ mm}^2$. The portable device is a mobile phone.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
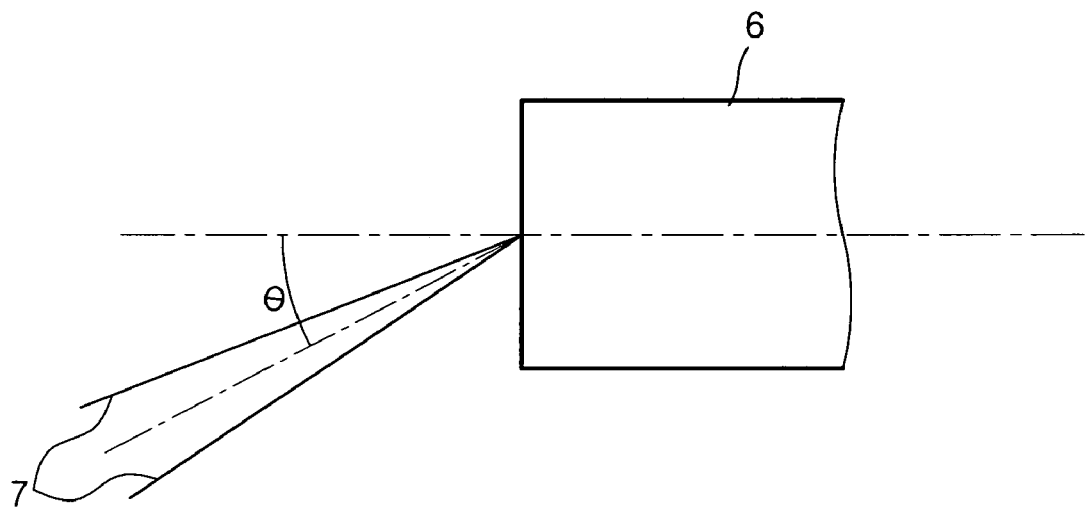
FIG. 3 is a schematic diagram of a light path used to explain the theory of the present invention.
Figure 4:
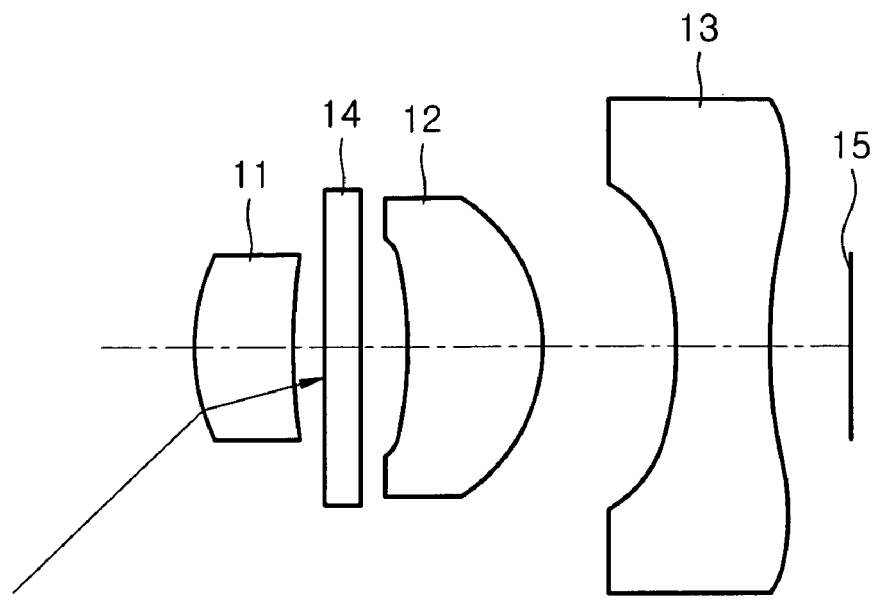
FIG. 4 is a schematic diagram of a lens system and an image pick-up apparatus employing the lens system according to an embodiment of the present invention.

FIG. 3 is a schematic diagram of a light path for explaining the theory of the present invention. FIG. 4 is a schematic diagram of a lens system and an image pick-up apparatus employing the lens system according to a first embodiment of the present invention.

In order to further miniaturize already-small cameras, especially those installed in portable devices such as mobile phones, a lens system included in the camera has to be miniaturized. However, as a consequence of miniaturizing the lens system, an angle at which light is incident on the lens system increases.

Here, as illustrated in FIG. 3, light reflected from an object is incident on a lens system 6 in the form of a light cone 7, which is similar to a circular cone. In this case, an incident angle □ of light traveling along the axis of the light cone 7 is called a telecentric angle, or chief ray angle. The telecentric angle is important because the light on the axis of the light cone 7 determines the form of a resulting image while the rest of the light cone determines only the brightness of the image.

As will be described later, the wavelengths of light blocked by an infrared cut filter differ according to the telecentric angle of light incident on the infrared cut filter. That is, as the telecentric angle of light incident on the infrared cut filter increases, fewer rays are permitted to pass through the infrared cut filter. In the case of normal incidence, the infrared cut filter blocks only infrared rays and transmits all visible rays. However, as the telecentric angle of the light incident on the infrared cut filter increases, an increasing proportion of red rays are also blocked in addition to the infrared rays.

Therefore, incident light having a large telecentric angle, e.g., light traveling from areas of an object distant from the optical axis of the lens system, suffers a visible reduction in red wavelengths. Accordingly, edge regions of an image formed using the lens system appear relatively bluish and the center region relatively reddish. As a result, the color of the image is not accurately portrayed.

Referring to FIG. 4, the lens system according to the first embodiment of the present invention includes a first lens 11, a second lens 12, a third lens 13, and an infrared cut filter 14. The infrared cut filter 14 is located between the first lens 11 and the second lens 12.

As shown in FIG. 4, the above-described problem of a relatively reddish center region and bluish edge regions can be prevented by disposing the infrared cut filter 14 between the first lens 11 and the second lens 12.

Figure 1:
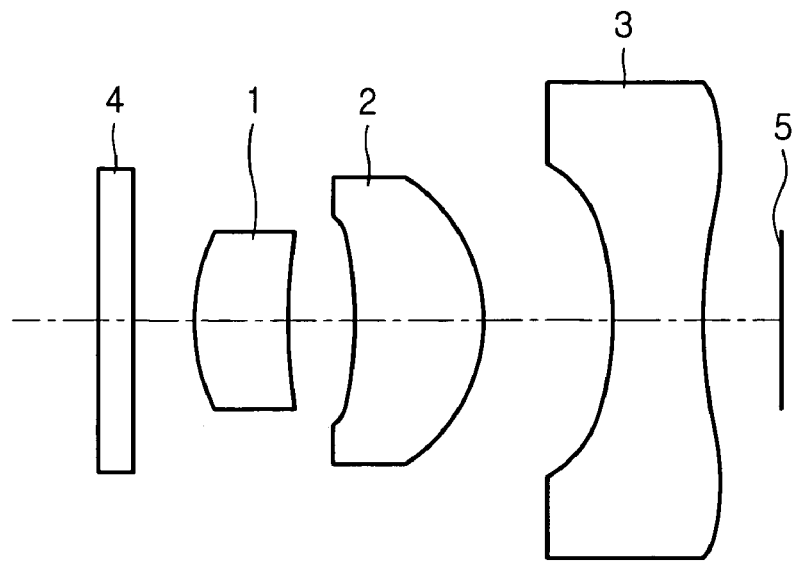
FIG. 1 is a schematic diagram of a conventional lens system.
Figure 2:
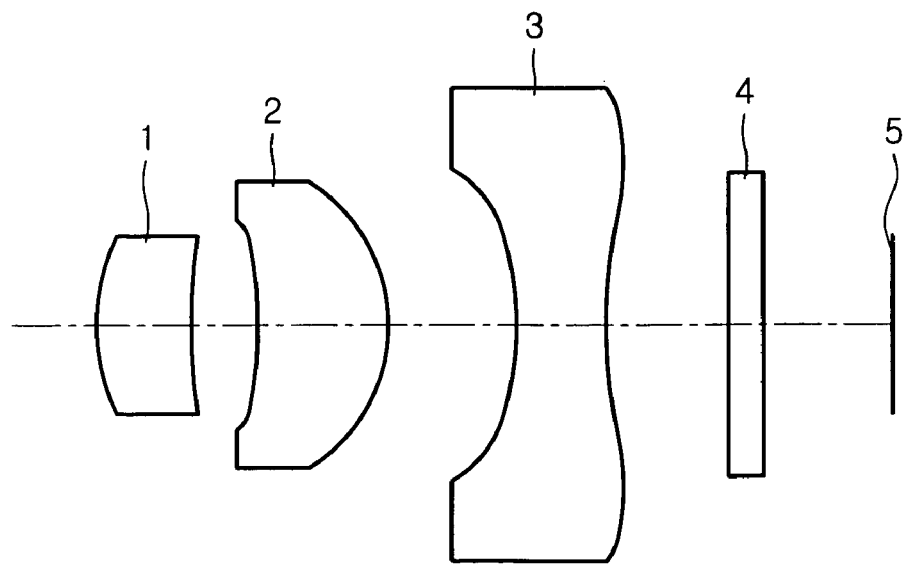
FIG. 2 is a schematic diagram of another conventional lens system.

That is, since the above-described problem occurs when the telecentric angle of light incident on the infrared cut filter 14 is large, it can be prevented by decreasing the telecentric angle of incident light on the infrared cut filter 14. A conventional method of lessening the telecentric angle of light incident on the infrared cut filter 14 is, as described with reference to FIG. 2, for an infrared cut filter 4 to be disposed between a lens system and an image pick-up device 5. However, in this case, a back focal length increases which consequently increases the size and the cost of an image pick-up apparatus. Thus, the conventional method goes against the current trend of producing ever more compact devices.

Therefore, as illustrated in FIG. 4, by disposing the infrared cut filter 14 between the first lens 11 and the second lens 12, the path of light reflected from the object is altered by passing through the first lens 11. Consequently, the telecentric angle of light incident on the infrared cut filter 14 is decreased, and thus the problem which occurs when the infrared cut filter 4 is disposed between the lens system and the image pick-up device 5 (see FIG. 2), as well the problem of image blurriness, are prevented. Here, it is preferable that the first lens 11 has a positive refractive power to change the path of light reflected from the object when it passes through the infrared cut filter 14 and to decrease the telecentric angle when the light is incident on the infrared cut filter 14.

Here, the lens system illustrated in FIG. 4 is one example; a lens system according to the present invention includes at least three lenses and interposes an infrared cut filter in any space between the lenses. Also, in the embodiment of FIG. 4 and other exemplary embodiments described herein, at least one lens is a plastic aspherical lens.

Meanwhile, since miniaturization is important for portable devices such as mobile phones, a lens system employed in such portable devices should be small, and it is preferable that the lens system has three lenses.

Figure 5:
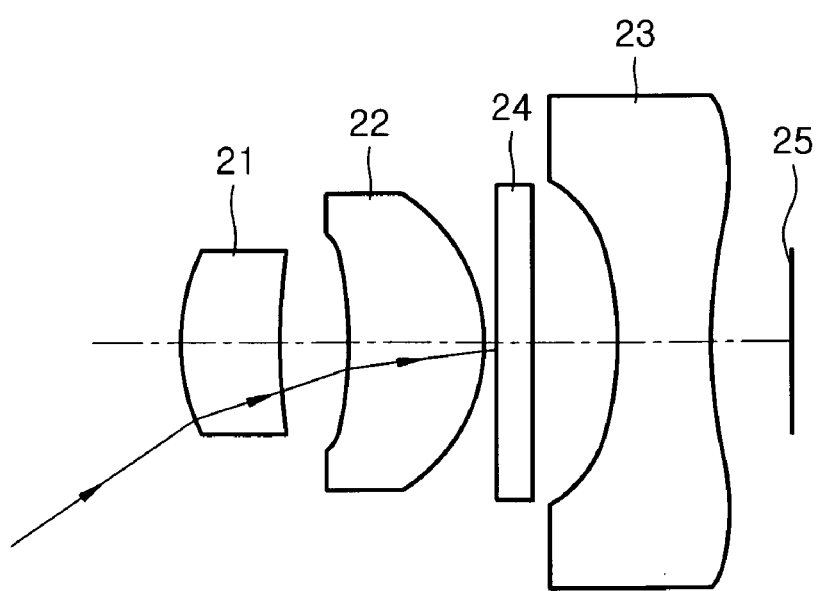
FIG. 5 is a schematic diagram of a lens system and an image pick-up apparatus employing the lens system according to another embodiment of the present invention.

FIG. 5 is a schematic diagram of a lens system and an image pick-up device according to a second embodiment of the present invention.

In the present embodiment, the lens system includes three lenses in the order of a first lens 21 having a positive refractive power, a second lens 22 having a positive refractive power, and a third lens 23 having a negative refractive power, from the direction in which light enters the lens system from outside. Also, an infrared cut filter 24 is interposed between the second lens 22 and the third lens 23.

As previously described, the smaller a telecentric angle of light incident on an infrared cut filter included in a lens system, the better. As illustrated in FIG. 5, a telecentric angle of light incident on the infrared cut filter 24 can be smaller, since the light path of the incident light is changed due to the first and second lenses 21 and 22, before being incident on the infrared cut filter 24. In this way, image distortion can be further reduced.

In order to achieve the further reduction of the telecentric angle when the light is incident on the infrared cut filter 24, it is preferable that the first and second lenses 21 and 22 have a positive refractive power. Also, before the light is incident on an image pick-up device 25 after it passes through the infrared cut filter 24, by making the light pass through the third lens 23 having a negative refractive power, accurate image information can be input to the image pick-up device 25.

Figure 6:
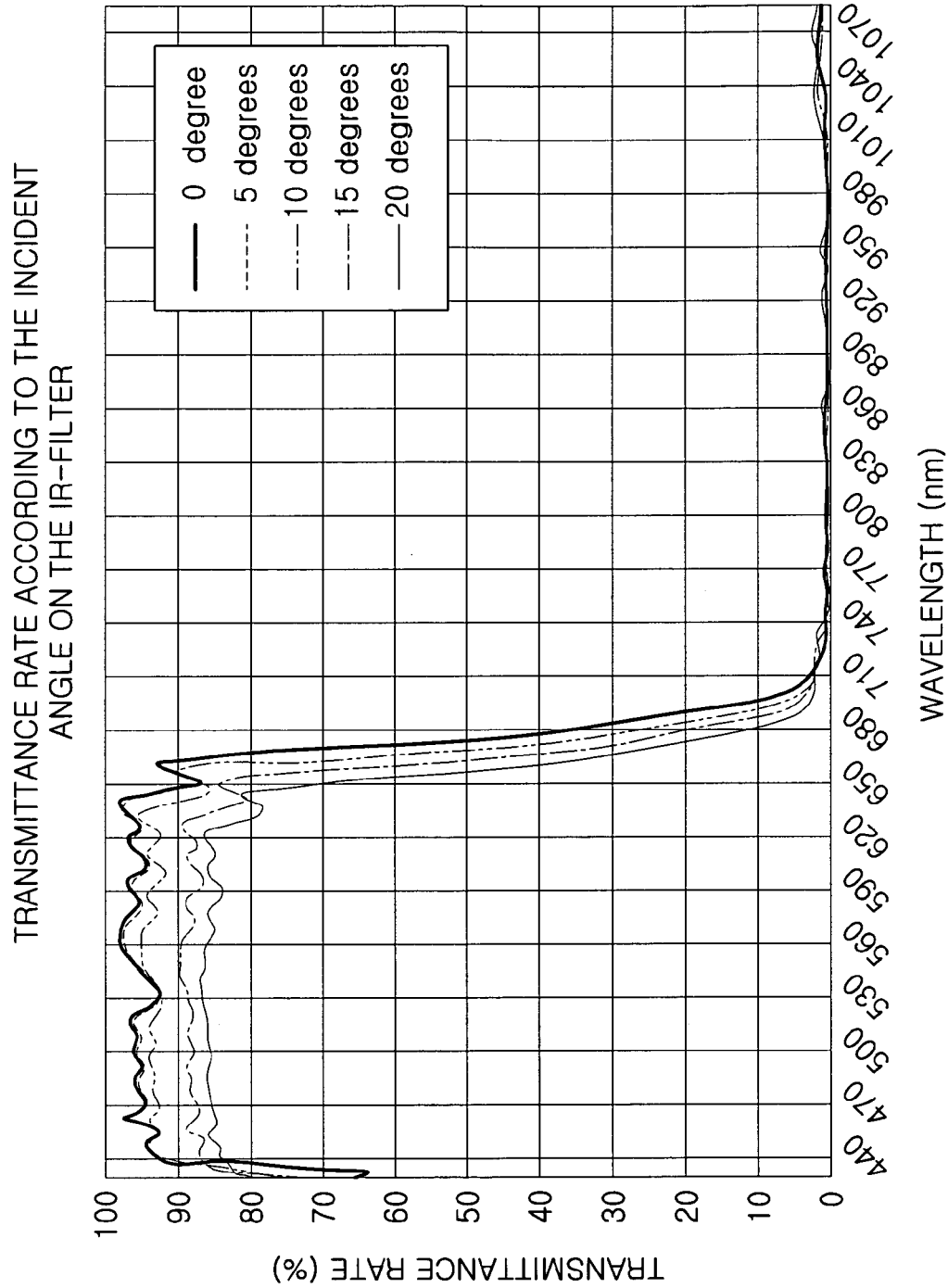
FIG. 6 is a graph illustrating change in the waveform of light transmitted through an infrared cut filter according to the angle at which the light is incident on the infrared cut filter.
Figure 7:
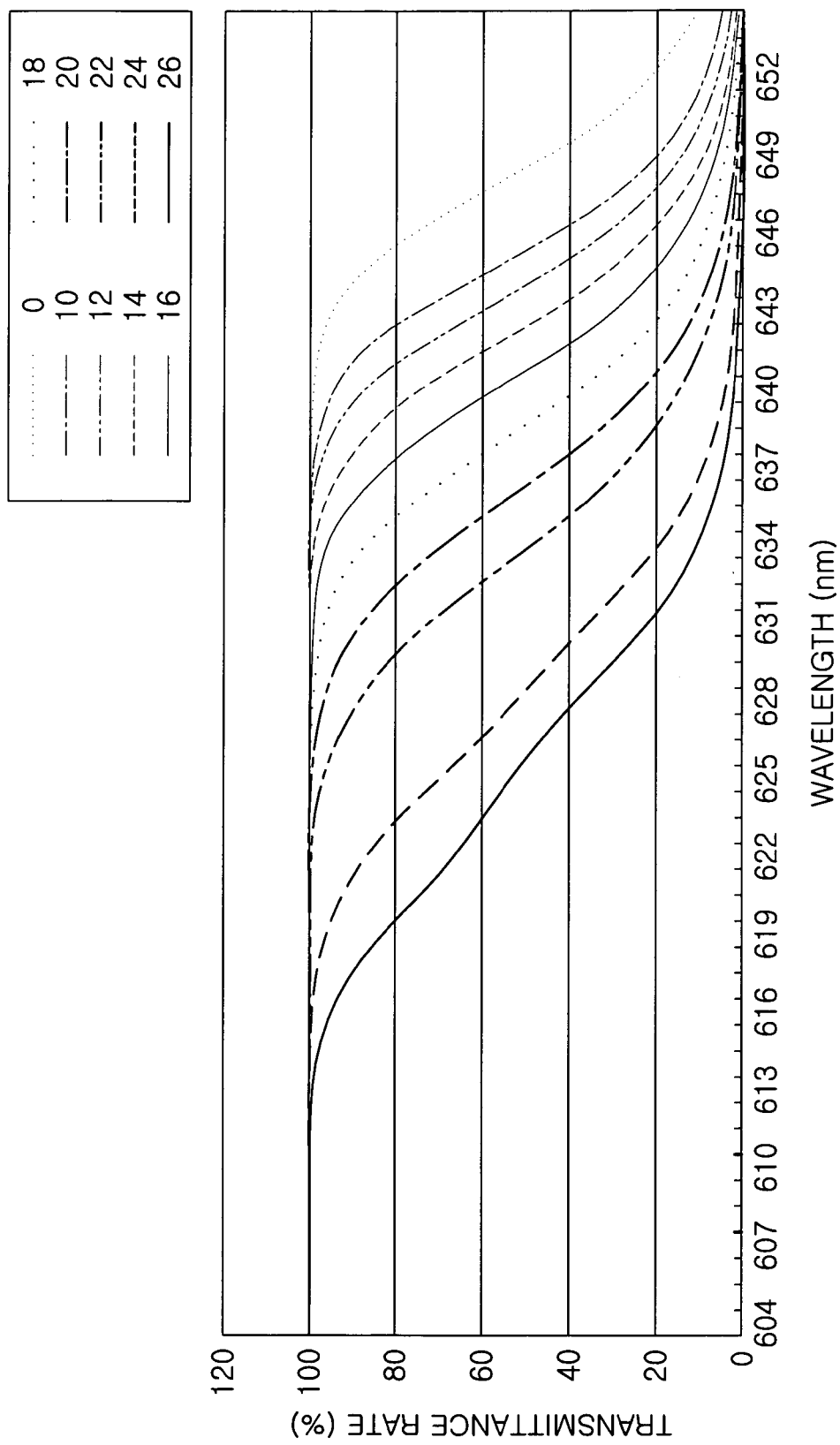
FIG. 7 is an enlargement of a portion of the graph of FIG. 6.

FIG. 6 is a graph illustrating change in the waveform of light transmitted through an infrared cut filter according to angle of incidence on the infrared cut filter, and FIG. 7 is an enlargement of a portion of the graph of FIG. 6.

Referring to FIGS. 6 and 7, it can be seen that as the angle of incidence, i.e., the telecentric angle, of light incident on the infrared cut filter increases, the wavelength of light passing through the infrared cut filter decreases. This shows that not only infrared rays but also red rays are increasingly blocked by the infrared cut filter as the telecentric angle increases.

If the telecentric angle is more than 16°, the transmittance of light having a wavelength over 640 nm, which are red rays, is less than 60%. As a result, edge regions of an image appear relatively bluish, and by comparison the center region appears reddish. That is, the image at the center, which is located at the optical axis of the lens system, is shown relatively reddish, while the image at the edge regions is shown relatively bluish. Therefore, in the above-described embodiments, if the angle incidence on the infrared cut filter 14 or 24 is denoted as $\ominus_1$, it is preferable that $\ominus_1$ is less than 16°. Referring to the graphs of FIGS. 6 and 7, when the angle of incidence on the infrared cut filter 14 or 24 is near 14°, the transmittance of 640 nm light, which are red, is more than 80%, which is satisfactory. Thus, as long as the incident angle $\ominus_1$ is greater than 14° and less than 16°, color convolution is satisfactorily suppressed. Therefore, in the above-described embodiments, the problem of a relatively reddish center region and bluish edge regions can be prevented by making $\ominus_1$ satisfy the following inequality:

$$14° \leq \ominus_1 \leq 16° \tag{1}$$

Because this lens system is intended for use in small portable devices, the size of the lens system will also be small. If the angle of incidence is less than 14 degrees, the size of the lens system and device containing the lens system will increase to a relatively large size. Therefore the angle needs to be greater than 14 degrees as well as less than 16 degrees.

Meanwhile, in the image pick-up device having the lens system according to the above-described embodiments, when $\ominus_1$ denotes the angle of incidence on the infrared cut filter 14 or 24, and $\ominus_2$ denotes the angle of incidence on the image pick-up device, it is preferable that $\ominus_1$ and $\ominus_2$ be made to satisfy the following inequality:

$$1.06 \leq \frac{\theta_2}{\theta_1} \leq 1.87 \tag{2}$$

Here, $\ominus_1$, as previously described, can be 14° to 16° to satisfy Inequality 1. If $$\frac{\theta_2}{\theta_1}$$

is below the lower limit of Inequality 2, the telecentric angle decreases. Accordingly, the total optical length of the lens system increases, preventing the lens system from being miniaturized. Also, if $$\frac{\theta_2}{\theta_1}$$

is greater than the upper limit in Inequality 2, the power of the lens in front of the infrared cut filter 14 or 24 gets stronger. Consequently, it becomes difficult to control spherical aberration and it becomes difficult to control the telecentric angle and curvature of image field, and astigmatism, etc., thereby blurring edge regions of the image. Therefore, it is preferable that $$\frac{\theta_2}{\theta_1}$$

satisfies Inequality 2.

Figure 8:
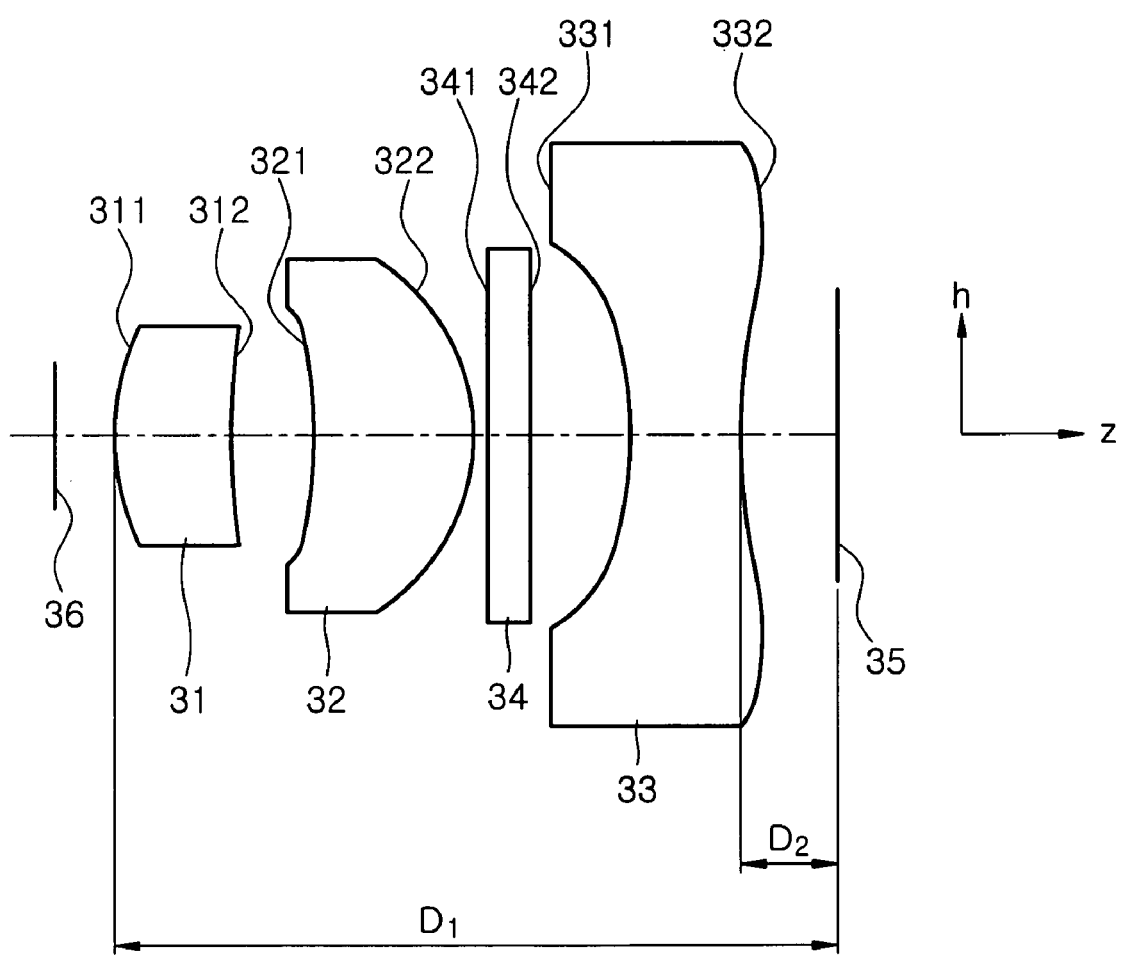
FIG. 8 is a schematic diagram of a lens system and an image pick-up apparatus employing the lens system according to still another embodiment of the present invention.

FIG. 8 is a schematic diagram of a lens system and an image pick-up device employing the lens system according to a third embodiment of the present invention.

The lens system in the present embodiment includes three lenses: a first lens 31, a second lens 32, and a third lens 33. The first lens 31 has $2^{nd}$ and $3^{rd}$ surfaces 311 and 312, the second lens 32 has $4^{th}$ and $5^{th}$ surfaces 321 and 322, and the third lens 33 has $8^{th}$ and $9^{th}$ surfaces 331 and 332. An infrared cut filter 34, which has $6^{th}$ and $7^{th}$ surfaces 341 and 342, is disposed between the second lens 32 and the third lens 33. An aperture 36 is disposed in front of the lens system and an image pick-up device 35.

If $D_1$ denotes a distance from the $2^{nd}$ surface 311, on which light is first incident, to the image pick-up device 35, and $D_2$ denotes a distance from the $9^{th}$ surface 332, through which light is output from the lens system to the image pick-up device 35, it is preferable that $D_1$ and $D_2$ be made to satisfy the following inequality:

$$3.3 \text{ mm}^2 \leq D_1 \times D_2 \leq 9.12 \text{ mm}^2 \tag{3}$$

If the value of $D_1 \times D_2$ is below the lower limit of Inequality 3, the total optical length decreases, thereby facilitating miniaturization, however the telecentric angle increases, which causes blurry images at the edge regions. Meanwhile, if $D_1 \times D_2$ exceeds the upper limit, the total optical length increases, which makes miniaturization difficult.

The shape of surfaces of the first, second, and third lenses 31, 32, and 33 are determined by Equation 4 below. In Equation 4, "z" denotes a distance in a direction to the image pick-up device 35 from the aperture 36, and "h" denotes a distance in a direction perpendicular to z and is getting further away from the optical axis of the lens system, as illustrated in FIG. 8.

$$z = \frac{ch^2}{1 + \sqrt{1-(1+k)c^2h^2}} + A_4h^4 + A_6h^6 + A_8h^8 + A_{10}h^{10} \tag{4}$$

Here, "k" denotes a conic constant, "c" denotes the curvature at the highest point of an aspherical lens surface, and $A_4$, $A_6$, $A_8$, and $A_{10}$ denote aspherical coefficients. The aspherical coefficients are as follows in Table 1.

TABLE 1

| Aspherical Coefficient | Aspherical Coefficient of $4^{th}$ Surface | Aspherical Coefficient of $5^{th}$ Surface | Aspherical Coefficient of $8^{th}$ Surface | Aspherical Coefficient of $9^{th}$ Surface |
|---|---|---|---|---|
| k | 9.289409 | 0.220806 | 10.000000 | −5.124037 |
| $A_4$ | −0.929926E−01 | −0.267368E−02 | −0.108744E+00 | −0.605616E−01 |
| $A_6$ | −0.213666E−01 | −0.283598E−01 | 0.388674E−02 | 0.102495E−01 |
| $A_8$ | 0.576697E−02 | 0.312522E−01 | 0.124078E−01 | 0.697619E−04 |
| $A_{10}$ | −0.951434E−01 | −0.160052E−01 | −0.326840E−02 | −0.243352E−03 |

Here, radius of curvature of each surface and distance from the aperture 36 to each surface, as illustrated in FIG. 8, and index of refraction of each lens and Abbe numbers, are as shown in Table 2.

TABLE 2

| Surface No. | Radius of Curvature (mm) | Distance (mm) | Refraction Index (nd) | Abbe No. (vd) |
|---|---|---|---|---|
| 311 | 1.88799 | 0.11 | 1.4874 | 70.4 |
| 312 | 7.41497 | 0.91 | | |
| 321 | −5.73095 | 1.45 | 1.5247 | 56.6 |
| 322 | −1.62199 | 2.55 | | |
| 341 | Infinity | 2.65 | 1.5168 | 64.2 |
| 342 | Infinity | 2.95 | | |
| 331 | −4.56488 | 3.64 | 1.6070 | 27.6 |
| 332 | 2.38436 | 4.40 | | |
| 35 | Infinity | 5.06 | — | — |

Figure 9:
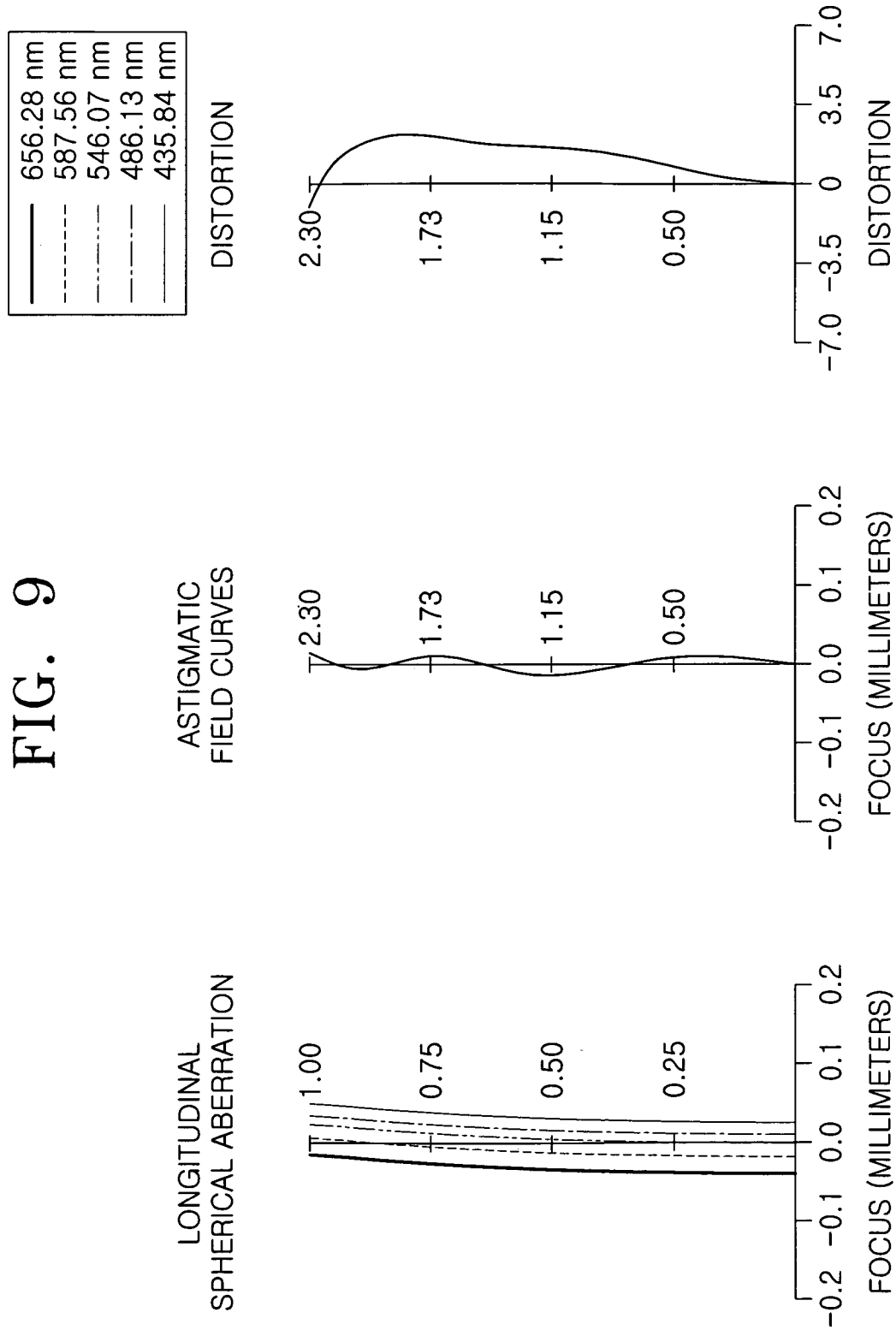
FIG. 9 shows graphs illustrating longitudinal spherical aberration, astigmatic field curves, and image distortion of a lens system according to the embodiments of the present invention.

FIG. 9 illustrates graphs showing longitudinal spherical aberration of a lens system, astigmatic field curvature, and image distortion, according to the above-described embodiments of the present invention. The graphs show data obtained using light of wavelengths 656.28 nm, 587.56 nm, 546.07 nm, 486.13 nm and 435.84 nm. Referring to the graphs of FIG. 9, it can be seen that spherical aberration, astigmatic field curvature, and image distortion are corrected, allowing clear and accurate image reproduction.

The lens system according to the present invention may be adopted in small size optical apparatuses such as portable devices, and especially in a mobile phone having a large telecentric angle of light incident on the lens system.

A lens system and a portable device employing the lens system according to the present invention achieve the following effects. First, distortion of an image at the center and edge regions can be prevented by disposing an infrared cut filter between any one of a plurality of lenses included in the lens system. Second, image blurriness can be prevented without increasing production costs by simply adjusting the conventional location of the infrared cut filter within the lens system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens system comprising at least three lenses and an infrared cut filter disposed between the second lens and the third lens such that a telecentric angle $\theta_1$ at which light is incident on the infrared cut filter satisfies $14° \leq \theta_1 \leq 16°$.

2. The lens system of claim 1, wherein at least one lens is a plastic aspherical lens.

3. The lens system of claim 1, wherein the lens system consists of three lenses.

4. The lens system of claim 3, wherein the first lens has a positive refraction power, the second lens has a positive refraction power, and the third lens has a negative refraction power, measured from a direction in which outside light enters the lens system.

5. A portable device comprising a lens system comprising at least three lenses and an infrared cut filter disposed between any of the lenses such that a telecentric angle $\theta_1$ at which light is incident on the infrared cut filter satisfies $14° \leq \theta_1 \leq 16°$, and further comprising an image pick-up device, wherein the angle $\theta_1$ at which light is incident on the infrared cut filter and an angle $\theta_2$ at which light is incident on the image pick-up device satisfy $$1.06 \leq \frac{\theta_2}{\theta_1} \leq 1.87.$$

6. The portable device of claim 5, further comprising an image pick-up device, wherein at least one lens is a plastic aspherical lens.

7. The portable device of claim 6, further comprising an image pick-up device,
wherein a distance $D_1$ from a front surface of the lens system on which light is incident to the image pick-up device, and a distance $D_2$ from a rear surface of the lens system through which light is output to the image pick-up device, satisfy $3.3 \text{ mm}^2 \leq D_1 \times D_2 \leq 9.12 \text{ mm}^2$.

8. The portable device of claim 5, further comprising an image pick-up device,
wherein a distance $D_1$ from a front surface of the lens system on which light is incident to the image pick-up device, and a distance $D_2$ from a rear surface of the lens system through which light is output to the image pick-up device, satisfy $3.3 \text{ mm}^2 \leq D_1 \times D_2 \leq 9.12 \text{ mm}^2$.

9. The portable device of claim 5, wherein the portable device is a mobile phone.

10. A portable device comprising a lens system consisting of three lenses and further comprising an image pick-up device, and an infrared cut filter disposed between the second lens and the third lens such that a telecentric angle $\theta_1$ at which light is incident on the infrared cut filter satisfies $14° \leq \theta_1 \leq 16°$.

11. The portable device of claim 10, wherein the first lens has a positive refraction power, the second lens has a positive refraction power, and the third lens has a negative refraction power, measured from a direction in which outside light enters the lens system.

12. The portable device of claim 11, further comprising an image pick-up device,
wherein a distance $D_1$ from a front surface of the lens system on which light is incident to the image pick-up device, and a distance $D_2$ from a rear surface of the lens system through which light is output to the image pick-up device, satisfy $3.3 \text{ mm}^2 \leq D_1 \times D_2 \leq 9.12 \text{ mm}^2$.

13. The portable device of claim 11, further comprising an image pick-up device,
wherein the angle $\theta_1$ at which light is incident on the infrared cut filter and an angle $\theta_2$ at which light is incident on the image pick-up device satisfy $$1.06 \leq \frac{\theta_2}{\theta_1} \leq 1.87.$$

14. The portable device of claim 13, wherein a distance $D_1$ from a front surface of the lens system on which light is incident to the image pick-up device, and a distance $D_2$ from a rear surface of the lens system through which light is output to the image pick-up device, satisfy $3.3 \text{ mm}^2 \leq D_1 \times D_2 \leq 9.12 \text{ mm}^2$.

* * * * *